US008244454B2

(12) United States Patent
Tertoolen

(10) Patent No.: US 8,244,454 B2
(45) Date of Patent: Aug. 14, 2012

(54) NAVIGATION DEVICE AND METHOD

(75) Inventor: Simone Francine Tertoolen, Amsterdam (NL)

(73) Assignee: TomTom International B.V., Amsterdam (NL)

( * ) Notice: Subject to any disclaimer, the term of this patent is extended or adjusted under 35 U.S.C. 154(b) by 1254 days.

(21) Appl. No.: 12/007,131

(22) Filed: Jan. 7, 2008

(65) Prior Publication Data

US 2009/0177383 A1    Jul. 9, 2009

(51) Int. Cl.
*G01C 21/30* (2006.01)
*G01C 21/32* (2006.01)
(52) U.S. Cl. .......................... 701/208; 701/200
(58) Field of Classification Search .................. None
See application file for complete search history.

(56) References Cited

U.S. PATENT DOCUMENTS

| | | | | |
|---|---|---|---|---|
| 6,324,469 | B1 * | 11/2001 | Okude et al. | 701/208 |
| 6,360,168 | B1 * | 3/2002 | Shimabara | 701/211 |
| 6,710,774 | B1 * | 3/2004 | Kawasaki et al. | 345/419 |
| 7,460,952 | B2 * | 12/2008 | Ogaki et al. | 701/209 |
| 7,590,487 | B2 * | 9/2009 | De Silva | 701/209 |
| 7,612,777 | B2 * | 11/2009 | Nagata et al. | 345/473 |
| 7,746,343 | B1 * | 6/2010 | Charaniya et al. | 345/428 |
| 7,974,781 | B2 * | 7/2011 | Emoto et al. | 701/211 |
| 2003/0176965 | A1 | 9/2003 | Padmanabhan | |
| 2008/0319655 | A1 * | 12/2008 | Vande Velde | 701/208 |
| 2010/0198509 | A1 * | 8/2010 | Orsatti et al. | 701/212 |

FOREIGN PATENT DOCUMENTS

| | | |
|---|---|---|
| EP | 0766217 | 4/1997 |
| EP | 1855263 | 11/2007 |
| JP | 2001027534 | 1/2001 |

OTHER PUBLICATIONS

International Search Report issued Dec. 4, 2008 for International Application No. PCT/EP2007/011256.

* cited by examiner

*Primary Examiner* — F. Zeender
*Assistant Examiner* — Christopher Buchanan

(57) ABSTRACT

This invention relates to a navigation device (200) comprising: an input interface (220, 240) configured to enable a user to select a destination; a processor (210); and a display (240) controllable by the processor; characterized in that the navigation device (200) further comprises: a store (230) for building data, said building data being representative of the shape of buildings at each of a plurality of destinations, and a destination view generation module (490) for generating, from building data stored in said store (230) for said user selected destination, a three-dimensional representation of a building at said user selected destination, said processor (210) being responsive to said destination view generation module (490) to control said display (240) to display said three-dimensional representation to said user.

21 Claims, 9 Drawing Sheets

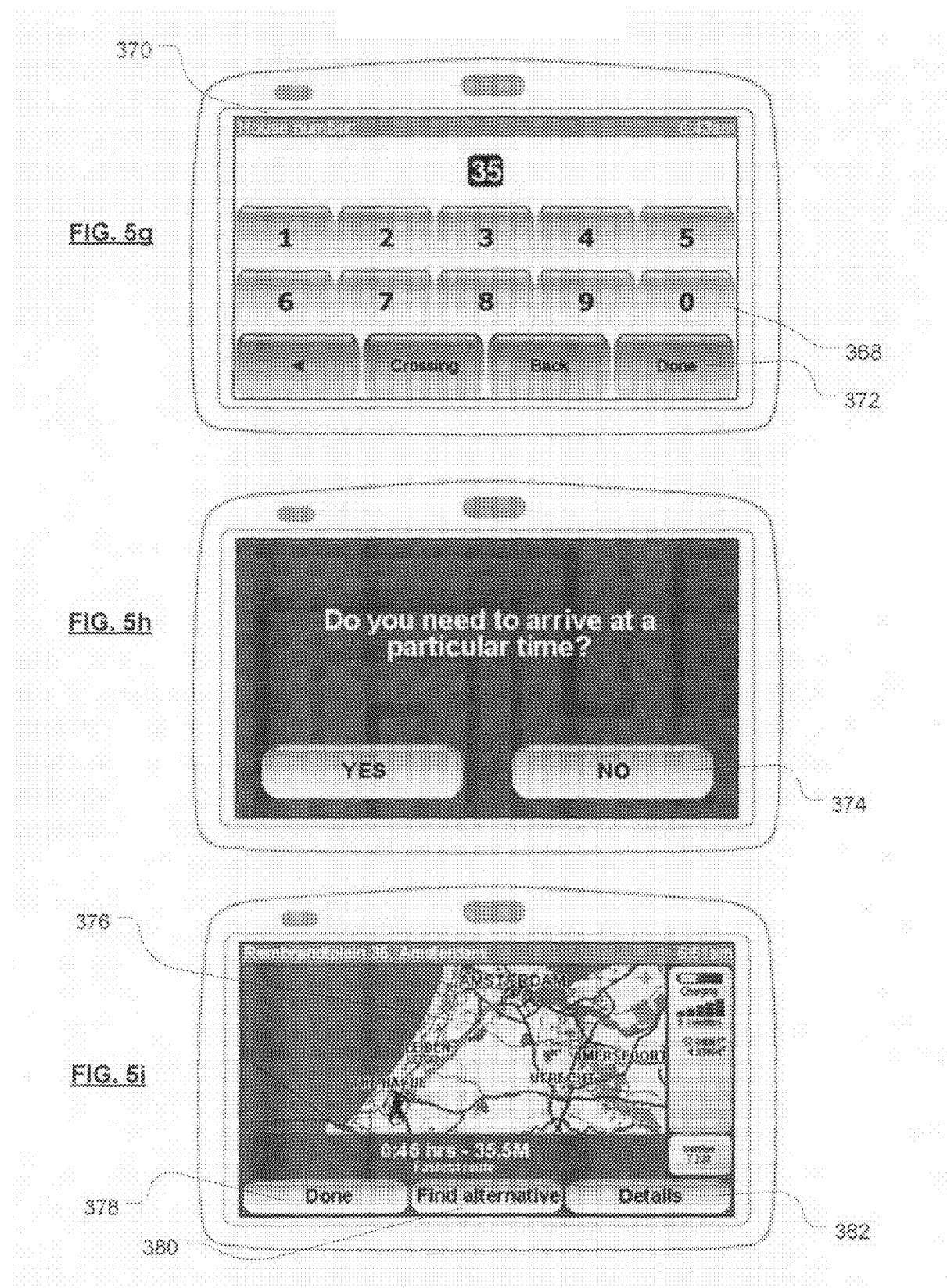

NAVIGATION DEVICE AND METHOD

FIELD OF THE INVENTION

This invention relates to navigation devices and to methods for displaying navigation maps. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 720T model manufactured and supplied by TomTom International B.V., provide a reliable means for enabling users to navigate from one position to another.

Such devices are of great utility when the user is not familiar with the route to the destination that they are navigating to. However, whilst the device is very useful in guiding the user to the destination, the user's unfamiliarity with the destination means that the user does not know what to expect. For example, if they are travelling to a building, they don't know what the building looks like and hence how to recognise the building, where the entrance to the building is, what the local environment looks like, or indeed where local facilities (such as car parking for example) are located.

These uncertainties can inconvenience and stress the user of the device. Moreover, they can significantly add to the user's journey time as the user may have to spend a considerable amount of time actually locating the destination and, for example, appropriate nearby car parking facilities. These uncertainties affect PND and in-vehicle navigation device users as well as users making use of route planning functionality from a computer, for example from a desktop computer at home or work.

By way of illustration, in the converse situation where the user is intimately familiar with the destination (for example if the destination is their home location) time delays and stress tend to be avoided, or at least mitigated, as the user will immediately recognise the destination and know (from their own person experience) where the best car parking facilities, for example, are located.

For these reasons it is generally the case that it is much easier to navigate to a destination with which the user is familiar, than it is for the user to navigate to a destination that the user is not familiar with.

It is an aim of the present invention to address this problem, in particular to attempt to make navigating to an unknown destination as easy as navigating to a known location.

SUMMARY OF THE INVENTION

In pursuit of this aim, a presently preferred embodiment of the present invention provides a navigation device comprising: an input interface configured to enable a user to select a destination; a processor, and a display controllable by the processor; characterized in that the navigation device further comprises: a store for building data, said building data being representative of the shape of buildings at each of a plurality of destinations, and a destination view generation module for generating, from building data stored in said store for said user selected destination, a three-dimensional representation of a building at said user selected destination, said processor being responsive to said destination view generation module to control said display to display said three-dimensional representation to said user.

Another embodiment of the present invention relates to a method of facilitating the identification of a destination, the method comprising the steps of: providing a store of building data, said building data being representative of the shape of buildings at each of a plurality of destinations; selecting a destination; retrieving building data, from said store (230), for a building at the selected destination; generating, from said retrieved building data, a three dimensional representation of the building at said selected destination; and controlling a display to display said three dimensional representation of the building at said destination.

Yet another embodiment of the present invention relates to computer software comprising one or more software modules operable, when executed in an execution environment, to cause a processor to: select a destination in response to input from a user via a user interface, retrieve building data from a store of building data, wherein the building data stored in said store is representative of the shape of buildings at each of a plurality of destinations; and the building data retrieved from said store relates to a building at the selected destination; generate, from said retrieved building data, a three dimensional representation of the building at said selected destination; and control a display to display said three dimensional representation of the building at said destination.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIGS. 5a to 5i are illustrative screenshots from a TomTom 720T PND for a destination input process;

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
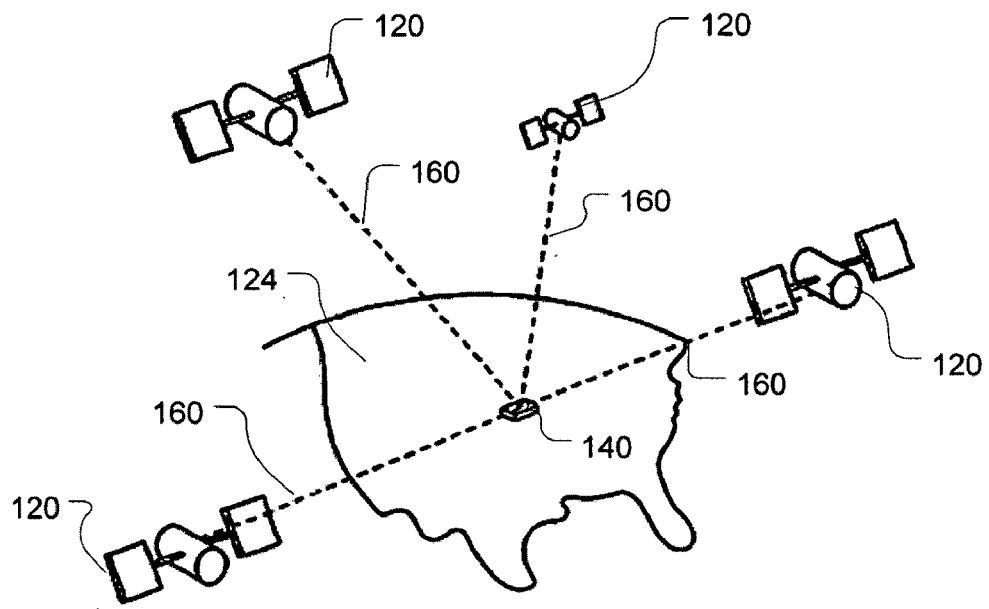
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
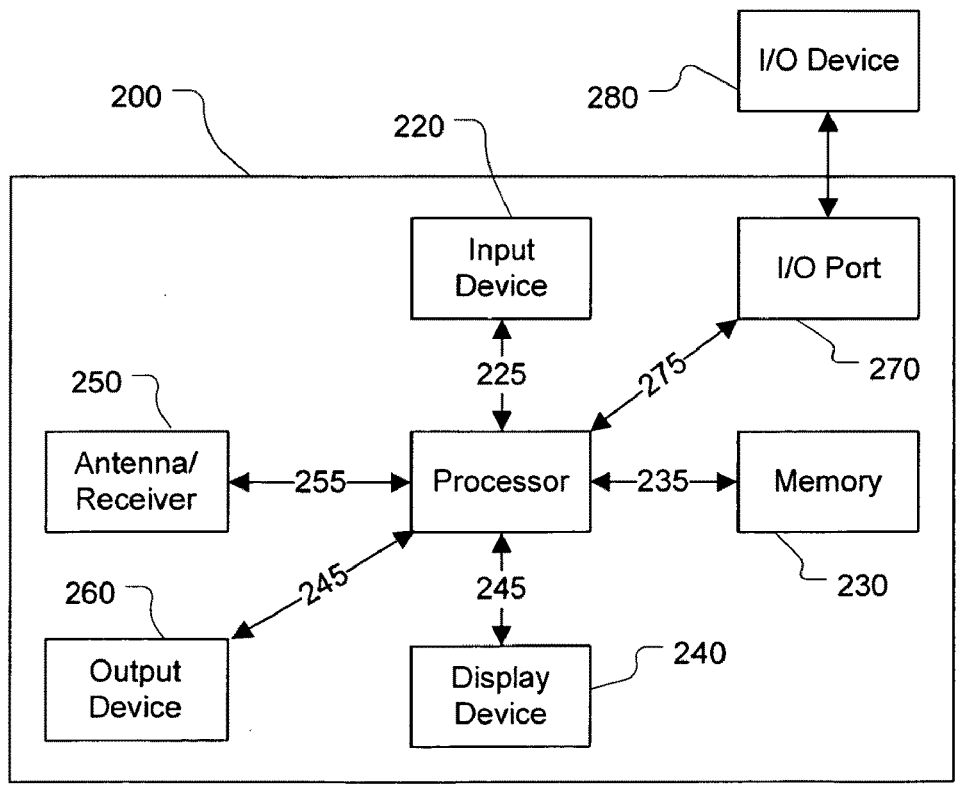
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectible to an I/O device 280 external to the navigation device 200. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
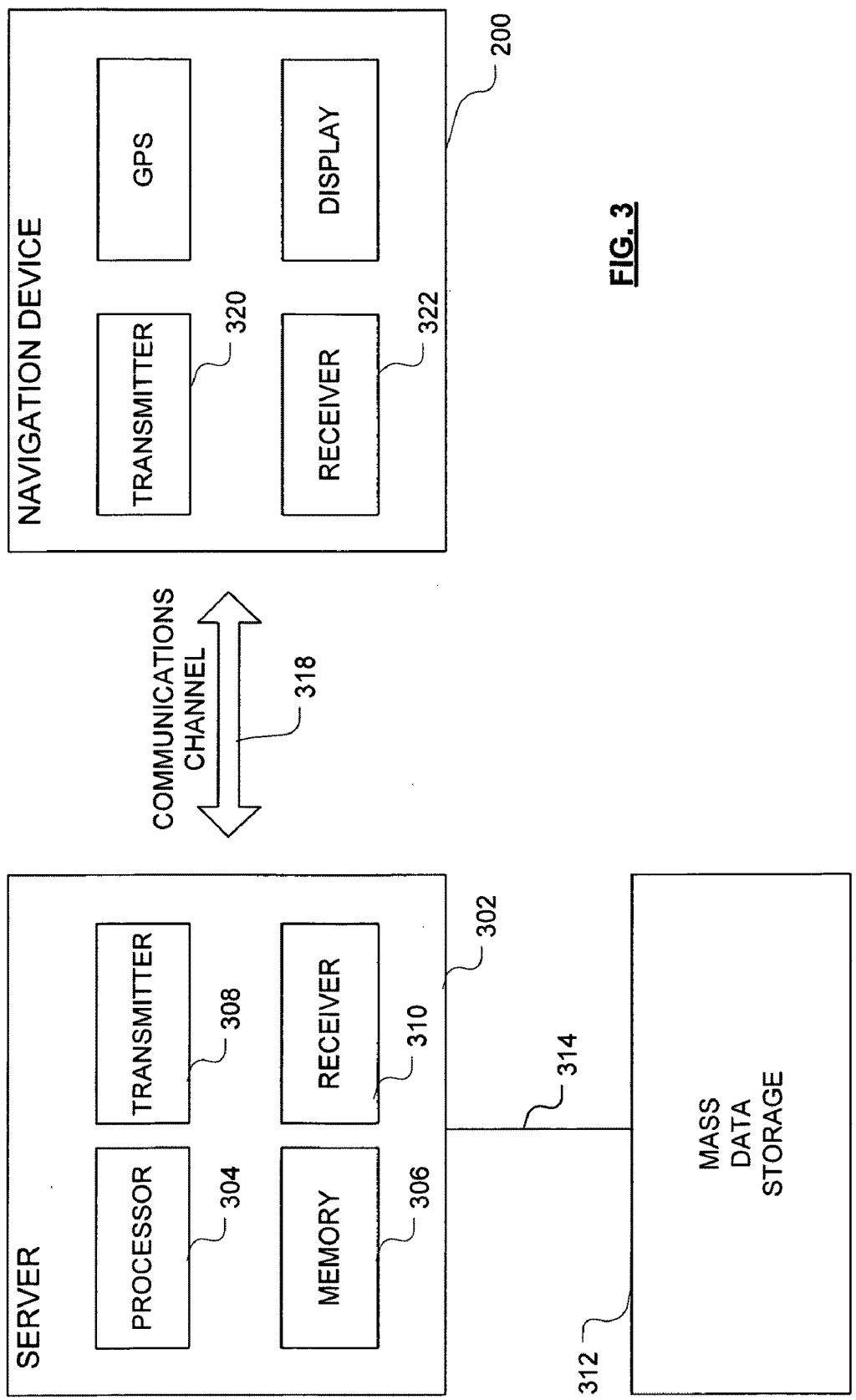
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
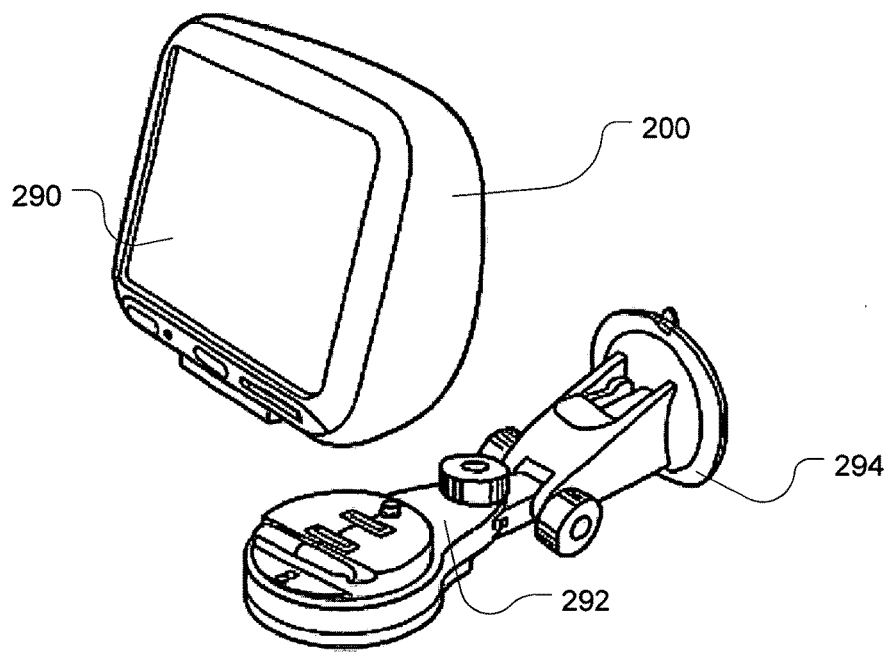
FIGS. 4A and 4B are illustrative perspective views of a navigation device.
Figure 4B:
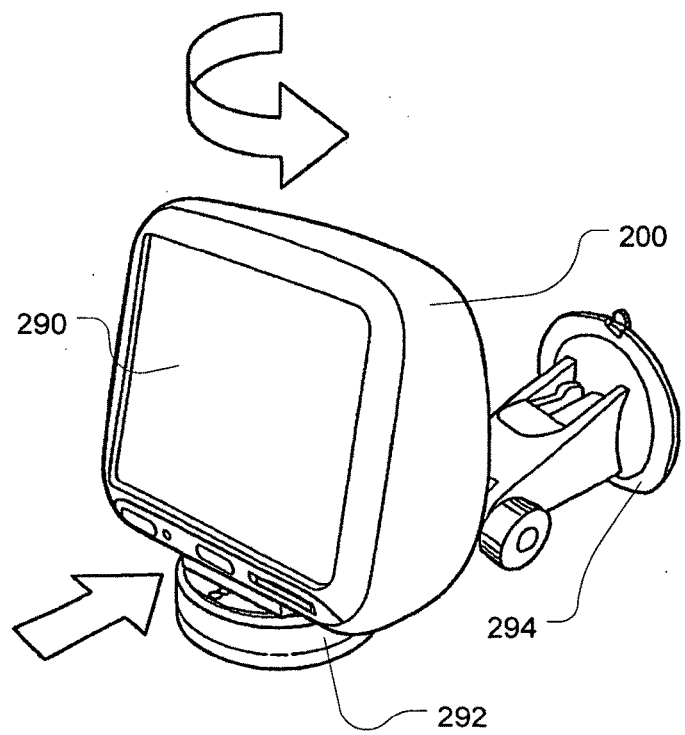

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Referring now to FIGS. 5a to 5i there is depicted a series of screenshots from a TomTom 720T navigation device. This model of TomTom PND has a touchscreen interface for displaying information to a user and for accepting input to the device from the user. The screenshots show an illustrative destination location input process for a user whose home location has been set to the offices in The Hague of the European Patent Office, and who wishes to navigate to a street address in Amsterdam, The Netherlands for which they know the street name and building number.

Figure 5A:
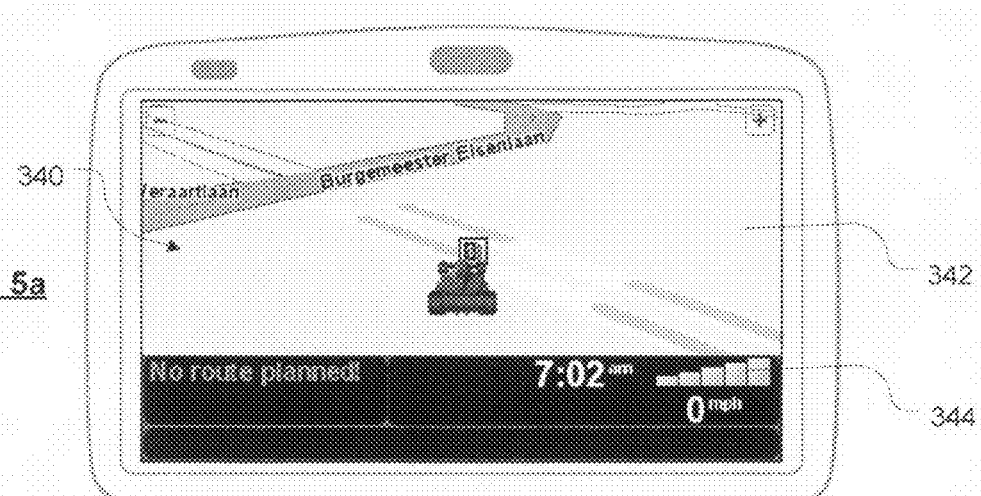

When this user switches on their TomTom PND, the device acquires a GPS fix and calculates (in a known manner) the current location of the PND. The user is then presented, as shown in FIG. 5a, with a display 340 showing in pseudo three-dimensions the local environment 342 in which the PND is determined to be located, and in a region 344 of the display 340 below the local environment a series of control and status messages.

Figure 5B:
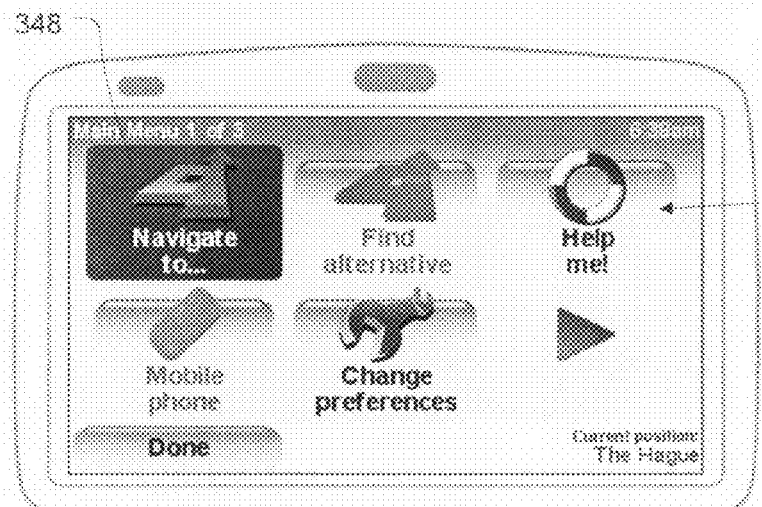

By touching the display of the local environment 342, the PND switches to display (as shown in FIG. 5b) a series of virtual buttons 346 by means of which a user can, inter alia, input a destination that they wish to navigate to.

Figure 5C:
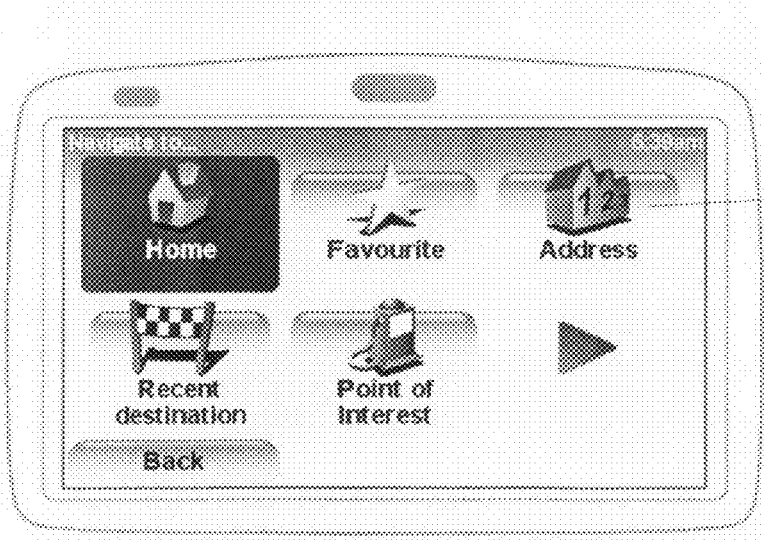

By touching the "navigate to" virtual button 348, the PND switches to display (as shown in FIG. 5c) a plurality of virtual buttons that are each associated with a different category of selectable destinations. In this instance, the display shows a "home" button that if pressed would set the destination to the stored home location. However, in this instance as the user is already at their home location (namely the EPO's offices in the Hague) selecting this option would not cause a route to be generated. The "favourite" button, if pressed, reveals a list of destinations that the user has previously stored in the PND and if one of these destinations is then selected the destination for the route to be calculated is set to the selected previously stored destination. The "recent destination" button, if pressed, reveals a list of selectable destinations held in the memory of the PND and to which the user has recently navigated. Selection of one of the destinations populating this list would set the destination location for this route to the selected (previously visited) location. The "point of interest" button, if pressed, reveals a number of options by means of which a user can opt to navigate to any of a plurality of locations, such as cash machines, petrol stations or tourist attractions for example, that have been pre-stored in the device as locations that a user of the device might want to navigate to. The "arrow" shaped virtual button opens a new menu of additional options, and the "address" button 350 commences a process by which the user can input the street address of the destination that they wish to navigate to.

Figure 5D:
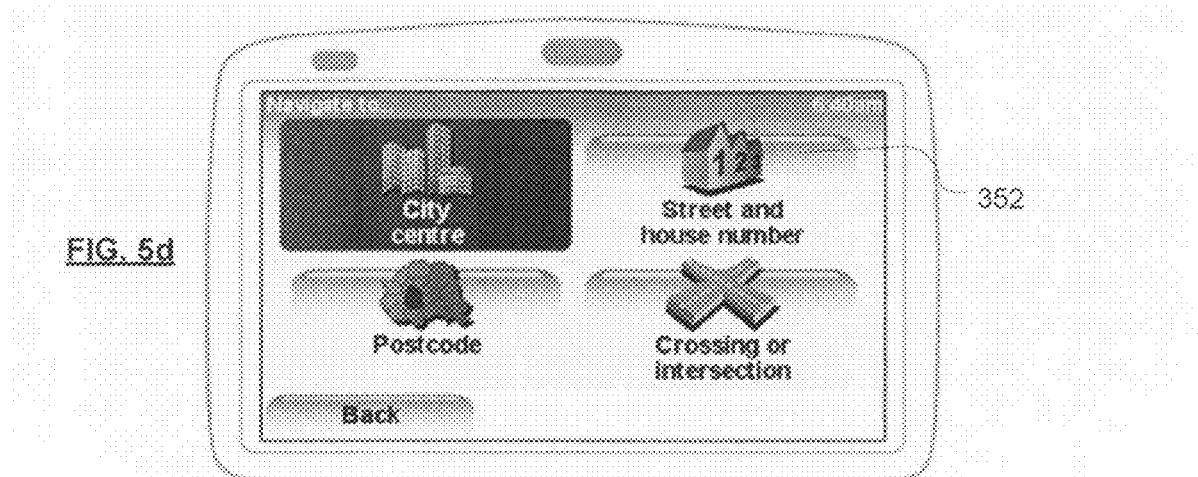

Since the user, in this example, knows the street address of the destination that they wish to navigate to, it is assumed that this "address" button is operated (by touching the button displayed on the touchscreen), whereupon (as shown in FIG. 5d) the user is presented with a series of address input options—in particular for address input by "city centre", by "postcode", by "crossing or intersection" (for example a junction of two roads) and by "street and house number".

Figure 5E:
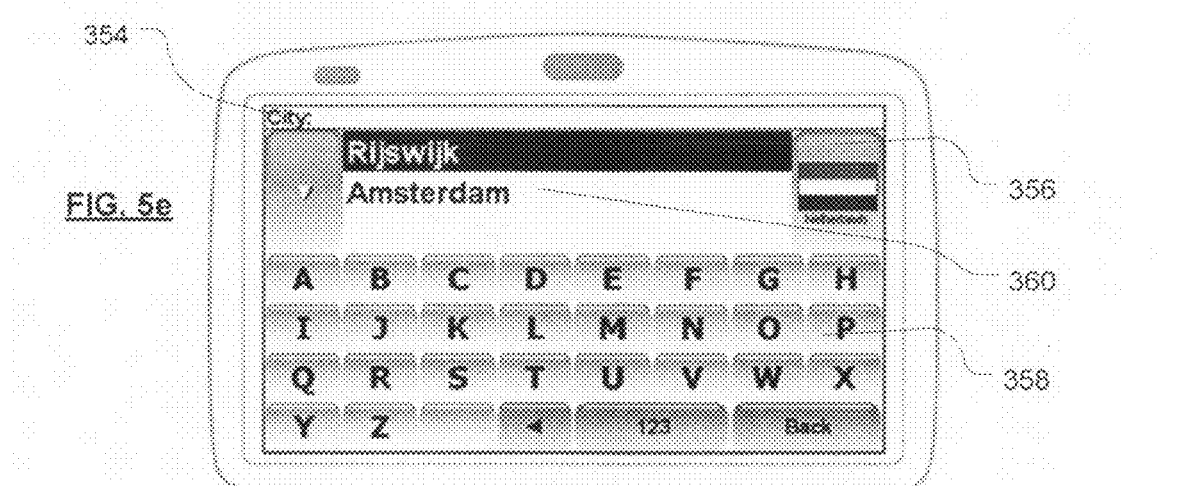

In this example the user knows the street address and house number of the destination and hence selects the "street and house number" virtual button 352 whereupon the user is then presented, as shown in FIG. 5e, a prompt 354 to enter the name of the city that they wish to navigate to, a flag button 356 by means of which the user can select the country in which the desired city is located, and a virtual keyboard 358 that may be operated by the user, if necessary, to input the name of the destination city. In this instance the user has previously navigated to locations in Rijswijk and Amsterdam, and the PND therefore additionally provides the user with a list 360 of selectable cites.

Figure 5F:
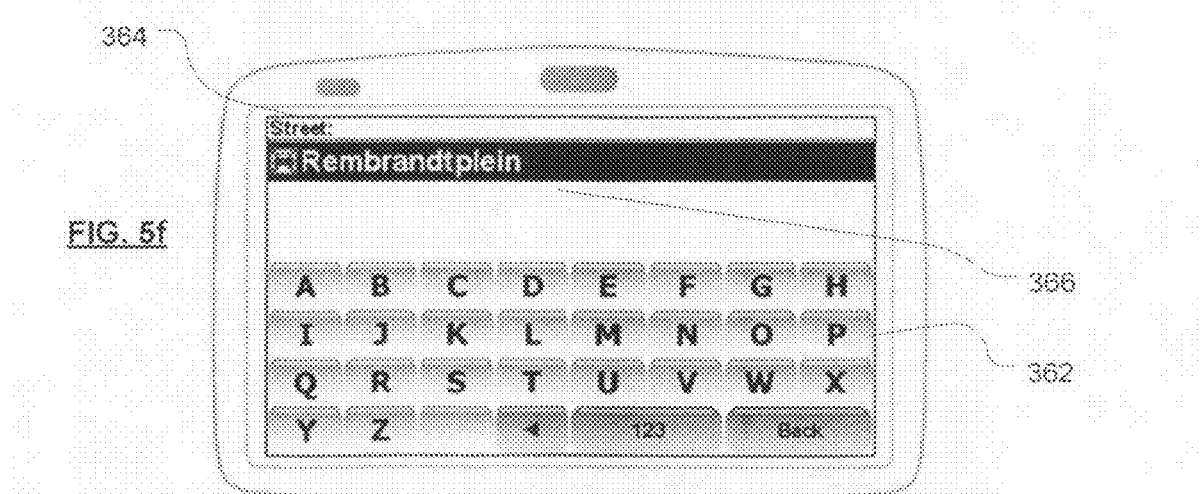

The user in this instance wishes to navigate to Amsterdam, and on selection of Amsterdam from the list 360 the PND displays, as shown in FIG. 5f, a virtual keyboard 362 by means of which a user can input street names, a prompt 364 for entry of a streetname 364 and, in this instance, as the user has previously navigated to a street in Amsterdam, a list 366 of selectable streets in Amsterdam.

In this example the user wishes to return to the street, Rembrandtplein, that they have previously visited and so selects Rembrandtplein from the displayed list 366.

Once a street has been selected, the PND then displays a smaller virtual keypad 368 and prompts the user, by means of prompt 370, to enter the number of the house in the selected street and city that they wish to navigate to. If the user has previously navigated to a house number in this street, then that number (as shown in FIG. 5g) is initially shown. If, as in this instance, the user wishes to navigate to No. 35, Rembrandtplein once again, then the user need only touch a "done" virtual button 372 displayed at the bottom right hand corner of the display. If the user should wish to navigate to a different house number in Rembrandtplein, then all they need do is operate the keypad 368 to input the appropriate house number.

Once the house number has been input, the user is asked in FIG. 5h, whether they wish to arrive at a particular time. If the user should push the "yes" button, then functionality is invoked that estimates the time required to travel to the destination and advises the user when they should leave (or if they are running late, should have left) their current location in order to arrive at their destination on time. In this instance the user is not concerned about arriving at a particular time and hence selects the "no" virtual button.

Selecting the "no" button 374 causes the PND to calculate a route between the current location and the selected destination and to display that route 376, as shown in FIG. 5i, on a relatively low magnification map that shows the entire route. The user provided with a "done" virtual button 378 which they can press to indicate that they are happy with the calculated route, a "find alternative" button 380 that the user can press to cause the PND to calculate another route to the selected destination, and a "details" button 382 that a user can press to reveal selectable options for the display of more detailed information concerning the currently displayed route 376.

Figure 6:
FIG. 6 is an illustrative screenshot from a TomTom 720T PND depicting a start location for an illustrative calculated route.

In this instance it is assumed that the user is happy with the displayed route, and once the "done" button 378 has been pressed the user is presented, as shown in FIG. 6, with a pseudo three-dimensional view of the current, start, location for the PND. The display depicted in FIG. 6 is similar to that shown in FIG. 5a except that the displayed local environment 342 now includes a start location flag 384 and a waypoint indicator 386 indicating the next manoeuvre (in this instance, a left hand turn). The lower part of the display has also changed and now displays the name of the street in which the PND is currently located, an icon 388 indicating the distance to and type of the next manoeuvre (from the current location of the PND), and a dynamic display 390 of the distance and time to the selected destination.

The user then commences their journey and the PND guides the user, in a known manner, by updating the map in accordance with determined changes in PND location, and by providing the user with visual and, optionally, audible navigation instructions.

Figure 7:
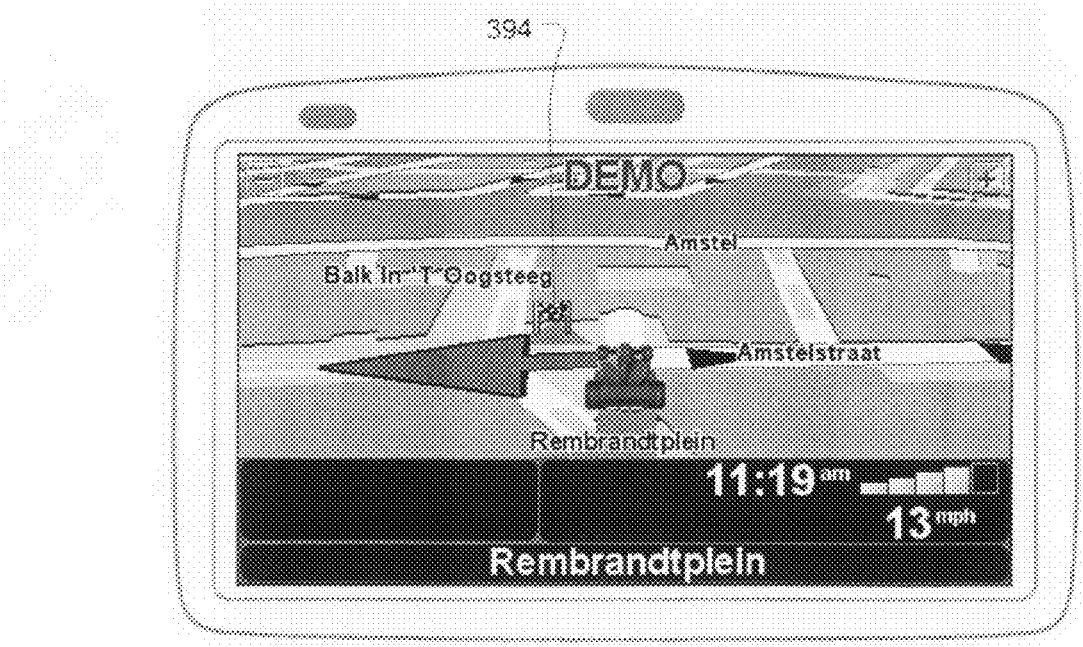
FIG. 7 is an illustrative screenshot from a TomTom 720T PND depicting a destination location for the aforementioned calculated route.

FIG. 7 is a schematic representation of the destination (in this instance: Rembrandtplein, 35) as denoted by the chequered flag 394. Although the destination flag, last waypoint 396 (in this instance a left hand turn) and neighbouring street names 398 are depicted, the level of detail for the buildings themselves (in particular the building height) is somewhat lacking. Although Rebrandtplein, 35 is perhaps more identifiable because of the way that it is, as indicated, set back from Amstelstraat, it will nevertheless be apparent that whilst a pseudo three-dimensional representation of the road layout is more than adequate for navigation, the absence of three dimensional building information can make it difficult for the user to find their location—particularly in circumstances where the destination is amongst buildings that are all very similar. Also missing is any detail concerning any local facilities, such as car parks for example, in the local environment depicted in the display of the PND.

It is the case, therefore, that a user presented with the display shown in FIG. 7 would still have to try to find, perhaps unassisted, a suitable car parking space and once that space has been found then navigate back to and correctly identify the particular building they want to visit.

Figure 8:
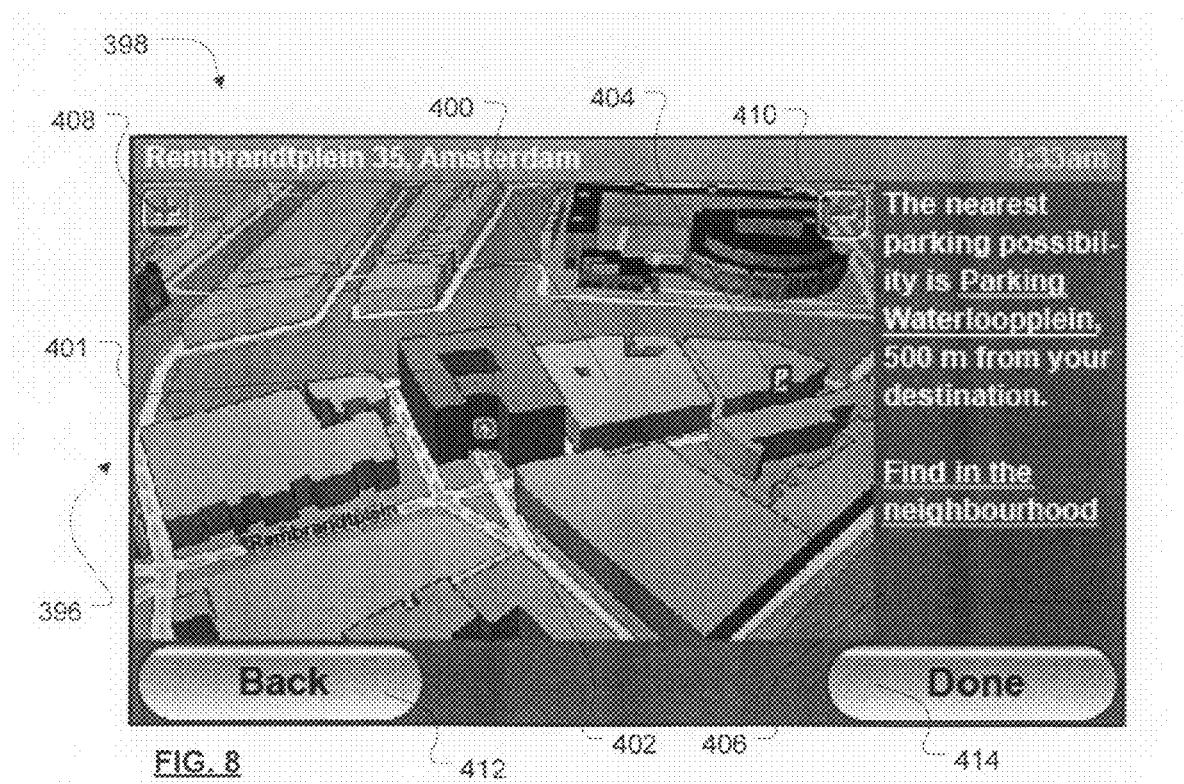
FIG. 8 is an illustrative screenshot generated by a destination preview function.

Referring now to FIG. 8 of the accompanying drawings, the PND of the preferred embodiment is configured, preferably once the destination has been input, to provide an enhanced pseudo three-dimensional view (as shown) of the destination location that is optionally further enhanced with additional information that may be of use to a user navigating to that destination. In a particularly preferred embodiment, the "destination view" depicted in FIG. 8 is generated and displayed after the user has confirmed their agreement with the calculated route (i.e. after the process step depicted in FIG. 5i), and as this occurs before the destination has been reached the view provided is in effect a "destination preview". In other arrangements the "destination view" could be displayed between the process steps depicted in FIGS. 5g and 5h, or between the process steps depicted in FIGS. 5h and 5i. The PND may be configured to again display the "destination view" when the PND is close to or has reached the destination, or indeed at any user selectable time between starting the journey and finishing it, or optionally at any time thereafter. In a particularly preferred arrangement, the destination view comprises a view of the local environment in which said destination location is located.

As shown in FIG. 8, the destination view 396 includes a header 398 in which the input destination address is shown (in the particular example depicted, the country has been omitted because the start and destination locations are within the same country), a plurality of three dimensional structures 400 that are each generally representative of a building, and—in this example—an entrance marker 402 representing the known or most likely position of the main entrance for the target destination building 401, and an information marker 404, in this instance a parking marker, indicating—again in this example—the position (or if off map, the direction) of the closest parking facilities. Other types of information markers, such as a marker for a cash dispenser, may also or alternatively be shown.

In one embodiment of the present invention the position of the entrance for the destination location may be associated, in the memory 230 of the PND 200, with stored data defining the position of that destination location. In this arrangement the position of the entrance may then be retrieved from the memory and accurately displayed to the user. In another embodiment, a likely possible entrance may be determined by assuming that the entrance to the destination address is located at some point, for example in the middle of, the face of the building closest to the road defined in the postal address for that destination.

The destination view also includes an information segment 406 in which details of any displayed information markers (optionally including the entrance marker) are displayed. The information segment may also include, as indicated, a user selectable "find in the neighbourhood" link which, when selected by the user (for example by touch), causes the PND to display a menu of points of interest, such as petrol stations or cash dispensers for example, that the user may wish to search for in the neighbourhood.

In a particularly preferred arrangement if a user should search for and find a point of interest (such as a petrol station for example) in the neighbourhood, then the user may be provided with the option of setting that point of interest as the destination location and navigating to that point of interest (instead of the previously entered destination location). In another arrangement the user may be provided with the option of setting that point of interest as a waypoint on the route to the previously entered destination location.

In the arrangement depicted the information segment 406 also includes a selectable link "Parking Waterloopplein" and additional information comprising, in this example, the distance between the selected destination location and the location associated with the information marker (in this case the parking marker 404). In a preferred arrangement, the user can select "Parking Waterloopplein" by touching the screen in the vicinity of the underlined text whereupon the PND will display additional information about the facilities provided (for example the times at which the facilities are open, a telephone number, or the cost) as well as virtual buttons allowing the user to opt to replace the previously entered destination location with the location corresponding to the (in this instance) parking marker, or to opt to designate the location corresponding to the information marker as a waypoint on the route to the destination (i.e. so that the user is, in this example, navigated to the destination via the Waterloopplein parking facility).

In a particularly preferred arrangement, information markers such as the aforementioned parking marker may only be displayed if they are within a predetermined, optionally user definable, distance of the destination location, for example if they are within 2 kilometres of the destination location.

In one embodiment of the invention the three-dimensional representations of the buildings may be rendered in a known manner similar to that by which navigation maps are rendered. For example, each destination address defined in map data stored in the navigation device may be associated with building data defining a series of lines—i.e. vectors (e.g. start point, end point, direction)—which are then rendered (along with addresses in the immediate vicinity of the destination address) by the processor 210 to form a three-dimensional representation of the road layout in the vicinity of the destination address, the building at that destination address, and the buildings surrounding the destination address. In a particularly preferred arrangement, the building corresponding to the destination location is rendered so as to be distinct (for example to be differently coloured) to other buildings in the local environment.

As shown in FIG. 8 the destination view also comprises a first virtual button 408 that is configured, when the touchscreen is touched in the vicinity of the button 408, to increase the magnification of the destination view 398, and a second virtual button 410 that is configured, when the touchscreen is touched in the vicinity of the button, to reduce the magnification of the destination view 398. As shown, it is preferred for these buttons to be transparent so that they do not obscure the underlying destination view. In a particularly preferred arrangement the PND may be configured, in the event that the destination view magnification is increased or reduced relative to a default magnification level by operating one or other of the buttons 408, 410 to automatically return the magnification level to the default level a predetermined period of time after the button has been pressed. It is also preferred for the destination view to include the name of the street in which the destination location is located.

The destination view includes a "back" virtual button 412 which, if operated, returns the user to the previously viewed display. For example, if the destination view should be displayed after the display depicted in FIG. 5g, pressing the back button will cause the display to revert to the image displayed in FIG. 5g. The destination view also includes a "done" virtual button that is configured, if operated by the user, to terminate display of the destination view.

In the preferred embodiment, the destination view is initially generated and subsequently displayed to the user so that the entrance to the building is oriented towards the user. It is also preferred for the destination view to be presented to the user by means of an animation that initially shows the surroundings of the destination building at a lower magnification level, before zooming into a display of the destination building at a higher magnification level. In a particularly preferred arrangement, the PND may incorporate known functionality that enables the user to rotate the destination view by dragging their finger to the left or right across the face of the touchscreen.

In a preferred arrangement, the abovedescribed destination view functionality may only be provided if the destination location has building data associated with it. In another particularly preferred arrangement the processor 210 may be configured to check whether the aforementioned list of recent destinations (revealed by the "recent destinations" virtual button shown in FIG. 5c) includes the current destination, and to only invoke the abovedescribed destination view functionality if the current destination is not listed in the list of recent destinations (on the grounds that if the user has recently been to this destination then they may well remember the location of the entrance and local facilities) or if the destination has not been visited within the immediate past (for example within the last month or so). In a particularly preferred arrangement the PND may be configured to update destination locations for storage in the aforementioned "recent destinations" list with options selected by the user when a destination view was generated. In this way a repeat visit to a given destination could, for example, automatically route the user to the parking facility closest to the given destination without requiring the user to actively select that option by invoking the destination view functionality.

As each and every destination may not have building data associated with it, the memory 230 may be configured to store generic building data that may be used if no building data is associated in the memory 230 with the particular selected destination location. In this arrangement it is preferred for the building generated from generic data to be configured (for example to be colour coded) to indicate to the user that the building displayed is merely generic and not necessarily representative of the actual shape of the building. In another arrangement, the PND may be configured, in the event that a destination is selected that has no building data associated with it in the memory 230 to check—for example via communications link 318—whether server 302 includes building data for that destination and download that data from server 302. If the PND is in communication with a wireless communications network, then download may occur "on the fly" whilst the PND is mobile. Otherwise download of that data may be marked to occur the next time that the data stored in the PND is updated.

Furthermore, as the location destination has associated with it latitude and longitude information it is also conceivable, in the event that no building data is stored in the memory and particularly in the case where the PND is connected to a remote server via a wireless network, for the processor to interrogate a satellite imaging database service (such as the Google™ Earth service provided by Google™) using the latitude and longitude information associated with the selected destination, retrieve from that service a satellite photograph of the local environment in which that destination location is located, and display the retrieved satellite photograph. The retrieved photograph may then be overlaid with information markers, for example to enable the user to locate the entrance for the selected destination or to navigate to the closest parking facility to that destination.

In another envisaged arrangement PND users could invoke functionality similar to that of TomTom's known MapShare™ software to associate photographs or other images with destination locations, and upload those photographs to a remote server from which other PND users may opt to download the photograph for display on their PND if they should opt to travel to the destination location with which the photograph or image is associated. For example, an owner of a private house—for which building data may not be available—may opt to upload a photograph or other image of the house to a remote server so that visitors using a PND to navigate to the owner's house can download an image of the house to their PND, and hence navigate more reliably to it. As before, the photograph could be supplemented with one or more information markers to identify, for example, the closest parking location to the property. A photograph could also be associated with a destination view generated by the PND, for example by means of a selectable icon provided in the information segment 406.

Figure 9:
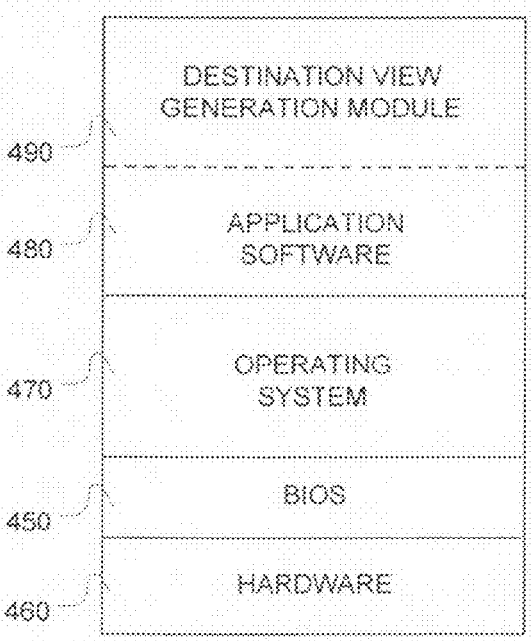
FIG. 9 is a schematic representation of the software employed by the navigation device.

Referring now to FIG. 9 of the accompanying drawings, the processor 210 and memory 230 cooperate to establish a BIOS (Basic Input/Output System) 450 that functions as an interface between the functional hardware components 460 of the navigation device 200 and the software executed by the device. The processor then loads from memory 210 an operating system 470 which provides an environment in which application software 480 (implementing some or all of the abovedescribed route planning and navigation functionality) can run. In accordance with the preferred embodiment of the present invention, part of this functionality comprises a destination view generation module 490, the function of which will now be described in detail in connection with FIG. 10.

Figure 10:
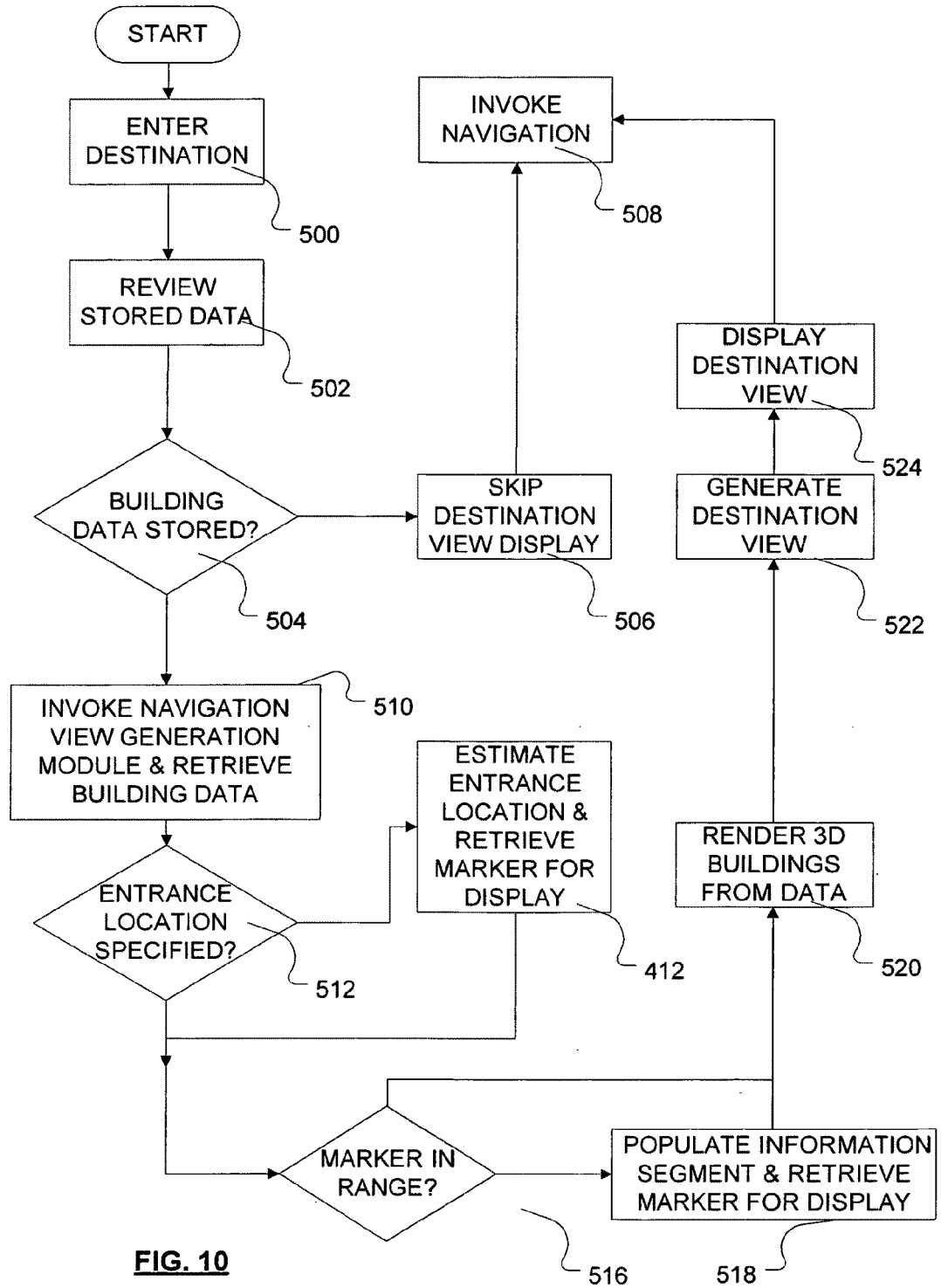
FIG. 10 is an illustrative flow diagram depicting the steps of one method by which the teachings of the present invention may be implemented.

FIG. 10 is a schematic flow diagram illustrating steps of a method by which the teachings of the present invention, in particular the functionality of the aforementioned destination view generation module, may be implemented. The method that will now be described is particularly relevant to a navigation device 200 that comprises a PND which is being used by a user who wishes to navigate along a route to a destination location. This notwithstanding, it will also be apparent that the following method may, with minor modifications, be used in a variety of different circumstances including generating routes and navigation guidance from a desktop computer.

As shown in FIG. 10, the user first inputs in step 500 (for example in the manner previously described) a destination location that they wish to navigate to. Once the destination location has been input the processor reviews in step 502 the data stored in the PND, for example in memory 230, and determines in step 502 whether any building data has been stored for the destination input in step 500.

If no building data has been stored, then in this embodiment the PND is set in step 506 to skip the remainder of the destination view generation process, and processing moves to step 508 where navigation commences. Other arrangements are described above.

If building data for the destination inputted in step 500 is stored in the PND, for example in memory 230, the processor starts the navigation view generation module 490 and that data is retrieved and then inspected in step 512 to determine whether the retrieved building data specifies the location of the entrance to the building. If the location of the entrance is not specified, the module then determines the most likely location of the building entrance to be in a face of the building closest to the street that forms part of the postal address of the building location, notes the location and retrieves from storage the appropriate marker for a building entrance.

Next, in step 516, the module interrogates the map data held in memory 230 to determine whether any information markers (relating to items such as parking facilities for example) are within a predetermined range (say, two kilometres) of the location. If there are any information markers in the map data within range of the destination location, the module notes the location of the closest marker, retrieves an appropriate icon for that marker, determines an appropriate display position for the icon in the destination view, and populates the information segment of the destination view with details of the marker.

The processor of the PND then renders, from the building data retrieved from the store, buildings for the destination location and neighbouring locations in step 520, and generates in step 522 the entire destination view for display. The processor then controls the display 240 to display the destination view generated in step 524.

When the user of the PND indicates that they are finished with the generated view (for example by pressing "done" button 414) processing reverts to step 508 aforementioned.

It will be apparent from the foregoing that the teachings of the present invention provide an arrangement whereby a user is provided with a more realistic view of a destination location and, optionally, facilities such as car parking in the vicinity of that location, which view allows the user to more easily navigate to that destination.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst the abovedescribed destination view includes images representative of buildings surrounding the destination address, it will be appreciated a destination view that included a rendered image of only the destination address would still help the user to identify and navigate to that address. Accordingly, whilst it is preferred to generate rendered images of the destination address and neighbouring buildings, this is not an essential feature of the invention.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A navigation device comprising:
an input interface configured to enable a user to select a destination;
a processor;
a store for building data and map data, said building data being representative of the shape of buildings at each of a plurality of destinations and said map data permitting the determination, by the processor, of a route between a first location and said user selected destination;
a display controllable by the processor; and
a destination view generation module for generating, from building data stored in said store for said user selected destination, a three-dimensional representation of a building at said user selected destination, said processor being responsive to said destination view generation module to control said display to display a view of the environment local to said user selected destination including said three-dimensional building representation to said user, wherein
one or more user selectable means are additionally displayed with said local environment view which relate to, or permit a user search for, one or more alternate facilities having a location within a vicinity of the original user selected destination and which, when selected, permit the user to reset the user selected destination to the location of the selected alternate facility.

2. A navigation device according to claim 1, wherein said destination view generation module is configured to identify the location of additional buildings in the vicinity of said selected destination, to retrieve building data from said store for said additional buildings, and to generate a three dimensional representation of said additional buildings for display with the three dimensional representation of the building at said selected destination.

3. A navigation device according to claim 2, wherein said destination view generation module is configured to render the building at said selected destination in such a way that it is distinct from three dimensional representations of said additional buildings.

4. A navigation device according to claim 1, wherein said building data includes information specifying the location of an entrance for the building at said destination.

5. A navigation device according to claim 4, wherein said destination view generation module is configured to retrieve the location of said entrance from said building data, and to include a representation of said entrance in said three-dimensional representation of the building at said selected destination for display by said display.

6. A navigation device according to claim 1, wherein said destination view generation module is configured to estimate the location of an entrance for the building at said selected destination, and to include a representation of said entrance in said three-dimensional representation of the building at said selected destination by said display.

7. A navigation device according to claim 6, wherein said navigation view generation module is configured to estimate the location of said entrance by identifying a face of the building at said destination which is closest to a street identified in a postal address of said destination, and include a representation of said entrance in the identified face of the three dimensional representation of said building for display by said display.

8. A navigation device according to claim 1, wherein said destination view generation module is configured to identify any information markers relating to facilities in the vicinity of said selected destination and to generate a representation of said markers within said local environment for display therewith.

9. A navigation device according to claim 8, wherein said destination view generation module is further operable to determine a distance between said selected destination and said identified information markers.

10. A navigation device according to claim 9, wherein said destination view generation module is configured to generate a representation, for display within said local environment, of a pointer to any identified markers that lie outside of said local environment and within the vicinity of said destination.

11. A navigation device according to claim 10, wherein said processor is configured to control said display to display a data panel for conveying additional information concerning one or more of any identified information markers.

12. A navigation device according to claim 11, wherein additional information displayed in said data panel includes a selectable link that, when selected by operation of the input interface, provides options to the user concerning operation of the navigation device.

13. A navigation device according to claim 12, wherein a said option comprises the option of controlling said navigation device to navigate the user to the location associated with the selected information item.

14. A navigation device according to claim 12, wherein said processor is configured to control said display to display, in said data panel, a user selectable search option that, when selected by operation of said input interface, is configured to provide the user with the option of searching for information markers of different types within the vicinity of said destination location.

15. A navigation device according to claim 1, comprising an antenna and a receiver for receiving data signals via said antenna, wherein said processor is configured to determine from said received data signals a current location of said navigation device, and to set said determined current position as a start position for said route generation process, and said processor is configured to implement route planning functionality to calculate a route from said start position to said selected destination.

16. A navigation device according to claim 1, wherein said user is prompted by said processor to input a current position as a start location wherein said processor is configured to implement route planning functionality to calculate a route from said start position to said selected destination.

17. A navigation device according to claim 16, wherein said processor is configured to generate a navigation map depicting a local environment surrounding said current position, and to update said navigation map as the current position changes with movement of the navigation device.

18. A navigation device according to claim 1, wherein the vicinity of said selected destination is user definable.

19. A method of facilitating the identification of a destination by a navigation device comprising at least one processor, the method comprising the steps of:
   selecting a destination, by said at least one processor, in response to input from a user via a user interface;
   providing a store of building data and map data, said building data being representative of the shape of buildings at each of a plurality of destinations, and said map data permitting a determination of a route between a first location and said user selected destination;
   retrieving building data, from said store, by said at least one processor, for a building at the selected destination;
   generating, from said retrieved building data, by said at least one processor, a view of the environment local to the said user selected destination and including a three dimensional representation of the building at said selected destination; and
   controlling, by said at least one processor, a display to display said view, wherein
   together with said view is additionally displayed one or more user selectable means which relate to, or permit a user to search for, one or more alternate facilities having a location within a vicinity of said user selected destination and which, when selected, permit the user to reset the user selected destination to the location of the selected alternate facility.

20. A system comprising a processor and computer software including one or more software modules operable, when executed in an execution environment, to cause the processor to:
   select a destination in response to input from a user via a user interface;
   retrieve building data from a store of building data, wherein the building data stored in said store is representative of the shape of buildings at each of a plurality of destinations; and the building data retrieved from said store relates to a building at the selected destination;
   retrieve map data from a store of map data, wherein the map data permits a determination of a route between a first location and said selected destination;
   generate, from said retrieved building data, a view of the environment local to the said selected destination and including a three dimensional representation of the building at said selected destination; and
   control a display to display said view together with one or more user selectable means which relate to, or permit a user to search for, one or more alternate facilities having a location within a vicinity of said selected destination and which, when selected, reset the selected destination to the location of the selected alternate facility.

21. A computer readable data storage medium having computer software stored thereon, said computer software comprising one or more software modules operable, when executed in an execution environment, to cause a processor to:
   select a destination in response to input from a user via a user interface;

retrieve building data from a store of building data, wherein the building data stored in said store is representative of the shape of buildings at each of a plurality of destinations;

and the building data retrieved from said store relates to a building at the selected destination;

retrieve map data from a store of map data, wherein the map data permits a determination of a route between a first location and said selected destination;

generate, from said retrieved building data, a view of the environment local to the said selected destination and including a three dimensional representation of the building at said selected destination; and control a display to display said view together with one or more user selectable means which relate to, or permit a user to search for, one or more alternate facilities having a location within a vicinity of said selected destination and which, when selected, reset the selected destination to the location of the selected alternate facility.

* * * * *